Patented June 9, 1925.

1,541,430

UNITED STATES PATENT OFFICE.

MATTHEW D. MANN, JR., OF ROSELLE, NEW JERSEY, ASSIGNOR TO STANDARD DEVELOPMENT COMPANY, A CORPORATION OF DELAWARE.

ART OF PURIFYING ESTER BODIES.

No Drawing.     Application filed May 9, 1922. Serial No. 559,596.

*To all whom it may concern:*

Be it known that I, MATTHEW D. MANN, Jr., a citizen of the United States, residing at Roselle, in the county of Union and State of New Jersey, have invented new and useful Improvements in the Art of Purifying Ester Bodies, of which the following is a specification.

The present invention relates to the purification of ester and similar organic bodies miscible with oils, for example, compounds of the type of ethyl acetate, propyl acetate, secondary butyl acetate, ethyl propionate, isopropyl ether, and the like. Such compounds are frequently accompanied by the corresponding alcohols, sometimes in the form of constant boiling-point mixtures, and the separation of such alcohols from the desired esters and ethers by fractional distillation is practically impossible.

In accordance with the present invention, the purification of such materials is effected in the following manner, the treatment of a mixture of ethyl acetate and ethyl alcohol being specifically described for purposes of illustration.

The alcohol-containing ester is admixed with a mineral oil, preferably one having an initial boiling-point of 325° F. or higher, and with water. The alcohol present is more soluble in the water than in the oil-ester mixture and as a result a layer separation takes place into an oil-ester layer and a water-alcohol layer. The oil-ester layer may be removed by any suitable means and subjected to fractional distillation. As the gap between the boiling-point of the ester and the initial boiling-point of the oil is preferably selected to be quite large, the ester may be very cleanly separated from the oil. In case any small amount of alcohol should be carried with the ester, it may be removed from the ester in a second fractional distillation.

The mineral oil used may suitably be gas oil, having an initial boiling-point of 325° F., mineral seal oil, having an initial boiling-point of 400 to 405° F., or a heavier oil.

The following example illustrates the application of the present process to a commercial sample of ethyl acetate containing about 87% of ester and 13% of alcohol. 300 parts by volume of mineral seal oil and 50 parts of water are admixed with 100 parts of such commercial ester. A layer separation takes place, the lower alcohol-water layer measuring about 60 parts by volume. The upper layer is removed and subjected to distillation. The distillate contains about 92.6% ester and is substantially free from water. If a purer product is desired, this distillate may be subjected to a further distillation, the alcohol present coming over with a small proportion of the ester as a constant boiling-point mixture, leaving a residue of substantially pure ester.

It is readily apparent that the process may be applied to other esters, ethers and other organic derivatives which are themselves slightly soluble or insoluble in water and are admixed with alcohols or other substances more soluble in water than in mixtures of the derivatives treated with oil.

I claim:

1. The method of purifying oil-miscible esters when associated with water-soluble alcohols which comprises admixing mineral oil and water with such materials and permitting a layer separation of the resulting mixture.

2. The method of purifying oil-miscible esters when associated with water-soluble alcohols which consists in admixing mineral oil and water with such materials, permitting layer separation of the mixture, removing the oil layer and distilling the ester-like material therefrom.

3. The method of purifying alkyl fatty acid esters associated with water-soluble alcohols which comprises admixing such esters with mineral oil and water, permitting layer separation of the mixture, and separately fractionally distilling the oil layer, thereby removing the ester therefrom.

4. The method of purifying lower alkyl fatty acid esters associated with water-soluble alcohols which comprises admixing such esters with mineral oil having an initial boiling-point above 325° F. and water, permitting layer separation of the mixture, and separately fractionally distilling the oil layer, thereby removing the ester therefrom.

5. The method of purifying lower alkyl acetates admixed with corresponding alcohols which consists in admixing mineral oil having an initial boiling point above 325° F. and water therewith, permitting layer separation of the mixture, removing the oil layer and distilling the acetate therefrom.

MATTHEW D. MANN, JR.